US010955072B2

(12) United States Patent
Miller

(10) Patent No.: US 10,955,072 B2
(45) Date of Patent: Mar. 23, 2021

(54) LIGHTWEIGHT HOSES

(71) Applicant: ContiTech USA, Inc., Fairlawn, OH (US)

(72) Inventor: Lance Miller, Uniontown, OH (US)

(73) Assignee: ContiTech USA, Inc., Fairlawn, OH (US)

( * ) Notice: Subject to any disclaimer, the term of this patent is extended or adjusted under 35 U.S.C. 154(b) by 260 days.

(21) Appl. No.: 16/124,421

(22) Filed: Sep. 7, 2018

(65) Prior Publication Data

US 2020/0080667 A1    Mar. 12, 2020

(51) Int. Cl.
| | | |
|---|---|---|
| *F16L 11/08* | (2006.01) | |
| *B32B 1/08* | (2006.01) | |
| *F16L 11/04* | (2006.01) | |
| *B32B 5/16* | (2006.01) | |
| *B32B 25/14* | (2006.01) | |
| *B32B 25/02* | (2006.01) | |
| *F16L 11/00* | (2006.01) | |

(52) U.S. Cl.
CPC ............... *F16L 11/08* (2013.01); *B32B 1/08* (2013.01); *B32B 5/16* (2013.01); *B32B 25/02* (2013.01); *B32B 25/14* (2013.01); *F16L 11/005* (2013.01); *F16L 11/04* (2013.01)

(58) Field of Classification Search
CPC .......... F16L 11/00; F16L 11/005; F16L 11/04; F16L 11/08; F16L 11/081; F16L 11/082; F16L 11/085; B32B 1/08; B32B 5/16; B32B 25/00; B32B 25/02; B32B 25/14
See application file for complete search history.

(56) References Cited

U.S. PATENT DOCUMENTS

| | | | |
|---|---|---|---|
| 2,722,263 A | 11/1955 | Beare et al. | |
| 3,989,067 A | 11/1976 | Gates, Jr. | |
| 4,644,977 A | 2/1987 | Arterburn | |
| 6,615,876 B2 | 9/2003 | Badders et al. | |
| 6,742,545 B2 | 6/2004 | Fisher et al. | |
| 7,281,547 B2 * | 10/2007 | Cleveland ................ B32B 1/08 | |
| | | | 138/137 |
| 2010/0055363 A1 | 3/2010 | Chevalier et al. | |
| 2011/0023988 A1 | 2/2011 | Ludwig et al. | |
| 2018/0045343 A1 | 2/2018 | Burrowes et al. | |

* cited by examiner

*Primary Examiner* — Walter Aughenbaugh
(74) *Attorney, Agent, or Firm* — David L. Cate; Gregory Adams

(57) ABSTRACT

Hoses including an inner tube defining a central longitudinal axis there through, a cover layer disposed proximate the inner tube, and a first reinforcement layer disposed between the inner tube and the cover layer, where a rubber compound forming one or more of the inner tube or the cover layer comprises glass beads, and the rubber compound has a specific gravity of 2.5 or less, a specific gravity of 1.3 or less, or even a specific gravity of 1.1 or less. The rubber compound may include glass beads in an amount of 100 phr or less, 40 phr or less or even 20 phr or less. In some cases, the hoses further include a second reinforcement layer disposed between the first reinforcement layer and the cover layer, and may even further include a friction layer disposed between the first reinforcement layer and the second reinforcement layer.

20 Claims, 1 Drawing Sheet

LIGHTWEIGHT HOSES

FIELD

The field to which the disclosure generally relates is flexible rubber hoses for low, medium, or, particularly, high pressure applications, and more particularly to a construction therefore, which is of a lightweight design.

BACKGROUND

This section provides background information to facilitate a better understanding of the various aspects of the disclosure. It should be understood that the statements in this section of this document are to be read in this light, and not as admissions of prior art.

Flexible rubber hose is used in a variety of hydraulic, pneumatic and other fluid transfer applications for conveying fluid over a range of pressures from about 50 psi (0.34 MPa) to 8000 psi (55 MPa) or more. In basic construction, hoses of the type herein involved typically are formed as having a tubular, inner tube or core surrounded by one or more outer layers of a braided, knit or spiral-wound reinforcement material which may be a metal or metal-alloy wire, or a natural or synthetic fiber. The reinforcement layers, in turn, are protected by a surrounding outermost jacket or cover which may be of the same or different material as the inner tube. The cover also provides the hose with increased abrasion resistance.

In the case of "rubber," as opposed to thermoplastic, hose constructions, the inner tube, may be provided as formed of a vulcanizable natural or, more typically, a synthetic rubber material such as Buna-N, neoprene, EPDM, FKM, and the like. Such material or blend may be conventionally extruded and cooled or cured to form the inner tube. In some cases, the tube may be cross-head extruded over a mandrel for support, or otherwise supported in later forming operations using air pressure and/or reduced processing temperatures. In some other cases, hoses may be prepared in a so-called wrap process.

The inner tube may be delivered through a braider and/or a spiral winder for its reinforcement with one or more surrounding layers of a wire and/or fibrous material or blend such as a monofilament, yarn, cord, yarn-wire composite, or roving. Such reinforcement layers are often applied under tension and typically may be formed of an interwoven braid or a spiral winding of a polyamide, polyester, polyphenylene bezobisoxazole, rayon, cellulose, polyvinyl acetate, or aramid yarn, or a high tensile steel or other metal wire. A relatively thin bonding or other interlayer of a vulcanizable rubber may be extruded or otherwise applied between each of the reinforcement layers to bond each layer to the next layer.

Following the braiding, winding, or other application of the reinforcement layers and the interlayers, an outer cover or sheath optionally may be applied. Such cover, which may be formed as a cross-head extrusion, a moisture-cured or solvent-based dipped coating, or a spiral-wound wrapping, typically comprises an abrasion-resistant synthetic rubber or a thermoplastic such as a polyurethane. Following the application of the cover, the hose construction so-formed by be heated to vulcanize the rubber layers and thereby consolidate the construction into an integral hose structure.

In normal use, such as in mobile, marine, industrial hydraulic, and pneumatic applications, typical hoses have a lack of buoyancy, are of high mass and thus specific gravity. In some circumstances, reduced specific gravity of the hose while using standard hose constructions and maintaining acceptable performance is desired. This may be the case, for example, where hoses are extended vertically in long lengths, weight savings are desired, or where the hoses need a target buoyancy.

Hence, it is desirable to have hoses, which are manufactured with standard constructions, have acceptable performance, and which exhibit lower specific gravity properties. Such needs are achieved by embodiments according to the disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, hoses include an inner tube defining a central longitudinal axis there through, a cover layer disposed proximate the inner tube, and a first reinforcement layer disposed between the inner tube and the cover layer, where a rubber compound forming one or more of the inner tube or the cover layer comprises glass beads, which may or may not be hollow, and the rubber compound has a specific gravity of 2.5 or less, 1.9 or less, 1.3 or less, 1.2 or less, or even a specific gravity of 1.1 or less. In some cases, the rubber compound may include glass beads in an amount of 200 phr or less, 100 phr or less, 60 phr or less, 40 phr or less, or even 20 phr or less.

In some cases, the hoses further include a second reinforcement layer disposed between the first reinforcement layer and the cover layer, and may even further include a friction layer disposed between the first reinforcement layer and the second reinforcement layer. In an aspect, the rubber compounds forming the inner tube, the cover layer and the tie layer each includes glass beads. In another aspect, rubber compounds forming the inner tube and the cover layer each includes glass beads.

In another aspect of the disclosure, hoses include an inner tube defining a central longitudinal axis there through, a cover layer disposed proximate the inner tube, and a first reinforcement layer disposed between the inner tube and the cover layer. The rubber compound forming one or more of the inner tube or the cover layer contains glass beads, and the hose has an inner diameter of 1 cm to 2 cm, as well as a wall thickness of from 1 mm to 3 mm.

In yet another aspect of the disclosure, buoyant hoses include an inner tube defining a central longitudinal axis there through, a cover layer disposed proximate the inner tube, and a first reinforcement layer disposed between the inner tube and the cover layer. The rubber compound forming one or more of the inner tube or the cover layer contains glass beads, and the hose has an inner diameter of 5 cm to 30 cm, as well as a wall thickness of from 2 mm to 8 mm.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
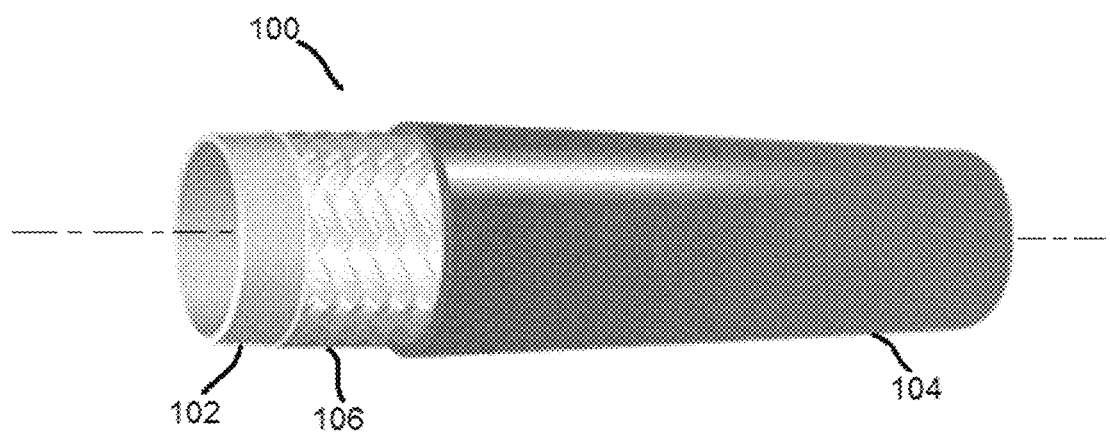
FIG. 1 illustrates in a perspective view, a hose according to some aspects of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

For illustration purposes, the precepts of lightweight flexible rubber or thermoplastic hose construction herein involved are described in connection with a configuration as particularly adapted for use in pneumatic, mobile, fluid transfer, industrial hydraulic applications, and the like. It will be appreciated, however, that aspects of the present disclosure may find use in other hose constructions for a variety of applications. Use within those such other applications therefore should be considered to be expressly within the scope of this disclosure.

In accordance with the disclosure, some embodiments are hoses with one or more layers having reduced specific gravity properties of the compound used in forming the layer(s). This reduces the overall weight of the hose in comparison to conventional hoses. For example, in buoyant hose applications, embodiments of the disclosure may be used to tune the specific gravity of the hose to achieve target buoyancy properties. Also, embodiments of the disclosure provide advantage in hoses and other rubber products increased abrasion resistance is needed.

In accordance with the disclosure, glass beads are admixed with the rubber compounds used to form the layer(s) to effectively reduce the specific gravity of the rubber compounds without sacrificing performance. Incorporation of the glass beads into the rubber compound forming the layer provides specific gravity values of 2.5 or less, 1.9 or less, 1.3 or less, 1.2 or less, or even 1.1 or less. The glass beads are admixed into rubber compounds and then used for an inner tube, a friction layer, and/or cover layer to give the intended benefits. In some cases, the glass beads may be used to offset the amount of high cost rubbers used, such as fluoroelastomers (i.e. FKM), and the like. In air hoses, the inner diameter defined by the inner tube may be from about 1 cm to about 2 cm, and the hose may have a wall thickness of from about 1 mm to about 3 mm. In buoyant hoses, the hose inner diameter size may be from about from about 5 cm to about 30 cm, and wall thickness of from about 2 mm to about 8 mm.

Referring now to the figures wherein corresponding reference characters are used to designate corresponding elements throughout the several views with equivalent elements being referenced with prime or sequential alphanumeric designations, a representative hose construction according to the disclosure is shown generally at 100 in the cut-away view of FIG. 1. In basic design, hose 100 extends axially to a length along a central longitudinal axis shown along the center of the hose within inner tube 102. The inner diameter and wall thickness dimensions may vary depending upon the particular fluid conveying application involved, but generally for many fluid conveyance applications, they will be between about 0.25 to about 8 inches (6-224 mm) for the inner diameter, and an overall wall thickness of from about 0.04 to about 0.20 inch (1 mm-5 mm). The wall of hose 100 is formed of inner tube 102, cover layer 104, and reinforcement 106 disposed between inner tube 102 and cover layer 104. Together, inner tube 102, cover layer 104, and reinforcement 106 defined the wall thickness.

As may be seen in FIG. 1, hose 100 is constructed as being formed about a tubular inner layer, i.e., inner tube or core, 102, which may be of a single or multi-layer construction, and generally includes a vulcanized rubber. In either construction, inner tube 102 has a circumferential outer core tube surface and a circumferential inner core tube surface which defines the inner diameter of the hose 100. In some embodiments, the inner tube or core, 102, and/or cover layer 106 further includes plurality of glass beads entrained therein. In some aspects, the glass beads are incorporated in an amount of 200 phr (per hundred resin by weight) or less, in an amount of 100 phr or less, in an amount of 60 phr or less, 40 phr or less, 20 phr or less, or even 10 phr, based upon the weight of the rubber compound forming the layer.

Figure 2:
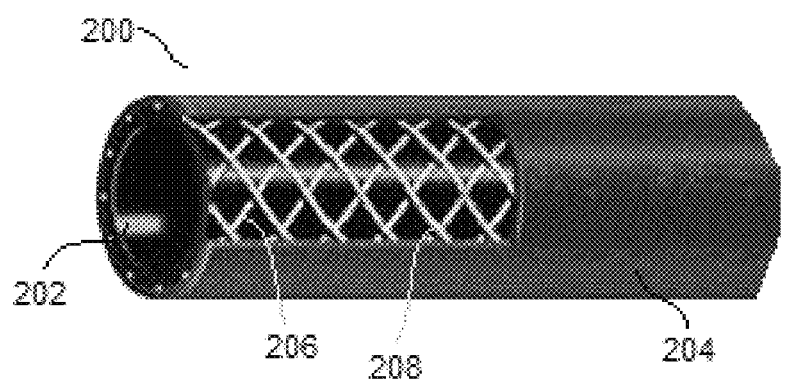
FIG. 2 depicts in a perspective view, another hose according to some aspects of the disclosure; and, FIG. 3 shows in a perspective view, yet another hose according to some aspects of the disclosure.

Now referencing FIG. 2, which illustrates another hose 200 embodiment according to the disclosure. Hose 200 includes inner tube 202 and outermost cover layer 204. Disposed between inner tube 202 and cover layer 204 are first reinforcement layer 206 and second reinforcement layer 208. As discussed above, the inner diameter, and an overall wall thickness may be the same or similar to those values described for hose 100, and the inner tube 202 and/or cover layer 204 may have glass beads entrained therein, in like amounts as hose 100.

Figure 3:
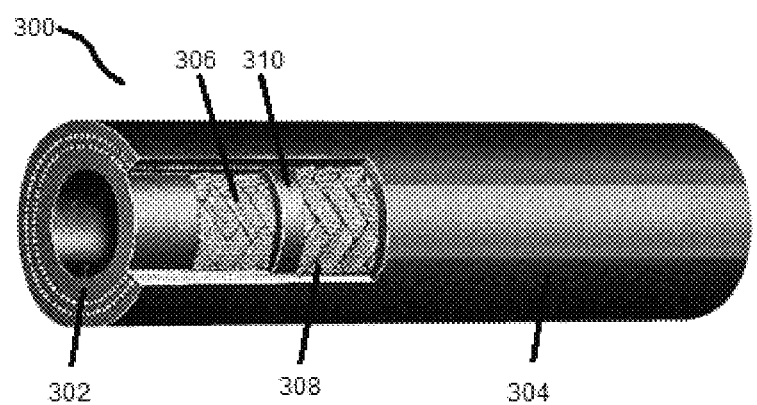

With reference to FIG. 3, another hose embodiment is depicted, where hose 300 includes inner tube 302, outer cover 304, as well as first reinforcement layer 306 and second reinforcement layer 308 disposed between inner tube 302 and cover layer 304. A friction layer 310 is disposed between first reinforcement layer 306 and second reinforcement layer 308. The inner diameter, and an overall wall thickness may be the same or similar to those values described for hose 100, and the inner tube 302 and/or cover layer 304 and/or friction layer 310 may have glass beads entrained therein, in like amounts as hose 100.

The glass beads used in embodiments of the disclosure may be selected from materials which provide a substantial decrease in specific gravity of the rubber compound used in one or more of the layers. Some non-limiting examples of such glass beads include, but not limited to, the iM Series of glass beads, the S Series of glass beads, the K Series of glass beads, all available from 3M™ Company, St. Paul, Minn., or even Expancel microspheres available from AkzoNobel, Sundsvall, Sweden.

In some hose embodiments, the inner tube, optional friction layer, and/or cover layer may be provided as extruded, or otherwise formed, of a crosslinkable natural rubber or a synthetic rubber such as fluoropolymer, chlorosulfonate, polybutadiene, butyl, neoprene, nitrile, polyisoprene, and buna-N, copolymer rubbers such as ethylene-propylene (EPR), fluoroelastomers (i.e. FKM), ethylene-propylene-diene monomer (EPDM), nitrile-butadiene (NBR) hydrogenated NBR (HNBR), cross-linked NBR (XNBR), and styrene-butadiene (SBR), or blends such as ethylene or propylene-EPDM, EPR, or NBR, and copolymers and blends of any of the foregoing. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation. By "abrasion-resistant," it is meant that such material for forming cover layers may have a hardness of between about 60-98 Shore A durometer. In some hose embodiments, one or more layers may alternatively be formed of thermoplastic materials.

Additional fillers and additives may be included in the formulation of the rubber compound depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or anti-foaming agents, anti-static agents, coupling agents such as titanates, chain extending oils, tackifiers, flow modifiers, pigments, lubricants, silanes, and other agents, stabilizers, emulsifiers, antioxidants, thickeners, and/or flame retardants. The formulation of the material may be compounded in a conventional mixing apparatus as an admixture of the rubber and filler components, and any additional fillers or additives. As crosslinked and filled with between about 0-66% of a carbon black filler.

Reinforcement layers, in some cases, may be conventionally formed as braided, knitted, wrapped, or helically wound of, for example, from 1 to about 180 ends of monofilament, continuous multi-filament, i.e., yarn, stranded, cord, roving, thread, tape, or ply, or short "staple" strands of a fiber material. The fiber material, which may be the same or different in layers may be a natural or synthetic polymeric material such as a nylon, carbon fiber, rayon, cellulose, cotton, polyester, polyamide, aramid, polyolefin, polyvinyl alcohol (PVA), polyvinyl acetate, or polyphenylene bezobisoxazole (PBO), or blend, a steel, which may be stainless or galvanized, brass, zinc or zinc-plated, or other metal wire, or a blend thereof. The area coverage of the reinforcement layers may be varied to achieve the desired flexibility, which may be measured by bend radius, flexural forces, or the like, of the hose.

Any of the materials forming the cover layers may be loaded with metal particles, carbon black, or another electrically-conductive particulate, flake, or fiber filler so as to render the hoses electrically-conductive for static dissipation or other applications. Separate electrically-conductive fiber or resin layers (not shown), which may be in the form of spiral or "cigarette-wrapped" tapes or otherwise provided, also may be included in the hose construction between the inner tube and the inner reinforcement layer, between the reinforcement layers, or between the outermost reinforcement layer and cover layer.

Examples

The following experimental data was generated for the purpose of further illustrating the nature of some of the embodiments and aspects of the disclosure, and are not intended as a limitation on the scope thereof. The following examples were prepared to illustrate improved inner tube properties for manufacturing and high performance hoses, in accordance with some aspects of the disclosure.

In the following examples, in a first pass, a non-productive blend of components was mixed in an internal mixer as indicated in table 1. The non-productive batch was dropped at a temperature of from about 280 deg F. to about 290 deg F. Thereafter, in a second pass, additional components were added to non-productive blend to form a product blend by mixing in an internal mixer. The productive batch was dropped at a temperature of from about 210 deg F. to about 230 deg F. Ingredients used for these examples, Ex. A through Ex. G, are provided in Table 1. Thereafter are provided descriptions/availability of ingredients used in the compounding of the non-productive and productive blends.

TABLE 1

| | Ex. A | Ex. B | Ex. C | Ex. D | Ex. E | Ex. F | Ex. G |
|---|---|---|---|---|---|---|---|
| Ingredients mixed in first pass | | | | | | | |
| Zinc Oxide | 3 | 3 | 3 | 3 | 3 | 3 | 3 |
| Kaolin | 102.5 | 83.5 | 63.5 | 43.5 | 93.5 | 83.5 | 63.5 |
| iM30k Glass beads from 3M™ | | 20 | 40 | 60 | | | |
| iM16k Glass beads from 3M™ | | | | | 10 | 20 | 40 |
| Carbon Black | 45 | 45 | 45 | 45 | 45 | 45 | 45 |
| Bis Tetrasulfide Plus Carbon Black | 1.25 | 1.25 | 1.25 | 1.25 | 1.25 | 1.25 | 1.25 |
| Carbon Black | 170 | 170 | 170 | 170 | 170 | 170 | 170 |
| Mercaptobenzothiazole Disulfide | 3 | 3 | 3 | 3 | 3 | 3 | 3 |
| Talc | 27.5 | 27.5 | 27.5 | 27.5 | 27.5 | 27.5 | 27.5 |
| Ethylene-propylene ethylidene norbornene rubber | 100 | 100 | 100 | 100 | 100 | 100 | 100 |
| High molecular weight natural fatty acid esters | 3 | 3 | 3 | 3 | 3 | 3 | 3 |
| Zinc Dibutyldithiocarbamate | 1.5 | 1.5 | 1.5 | 1.5 | 1.5 | 1.5 | 1.5 |
| Hexadecanoic/Octadecanoic acid | 1 | 1 | 1 | 1 | 1 | 1 | 1 |
| Hydrotreated Residual Oil | 140 | 140 | 140 | 140 | 140 | 140 | 140 |
| Tetramethylthiuram Disulfide | 1.2 | 1.2 | 1.2 | 1.2 | 1.2 | 1.2 | 1.2 |
| Ingredients added for second pass | | | | | | | |
| Sulfur | 0.5 | 0.5 | 0.5 | 0.5 | 0.5 | 0.5 | 0.5 |
| Polyethylene | 1 | 1 | 1 | 1 | 1 | 1 | 1 |
| 4,4'-Dithiobismorpholine | 0.8 | 0.8 | 0.8 | 0.8 | 0.8 | 0.8 | 0.8 |

The productive blends were then formed into 2 mm thick sheets, and either tested in 'green' form, uncured form, for green strength, or cured at temperature of about 320 deg F. for 30 minutes. Physical property testing was conducted on the cured example sheets or uncured examples. The evaluations for tensile (psi), elongation %, Mod 5 (psi), Mod 10 (psi), Mod 25 (psi), Mod 50 (psi) and Mod 100 (psi) were conducted according to ASTM D412. Shore A was conducted according to ASTM D2240, Tear Die C (lbf/in) according to ASTM D624, Volume swell % according to ASTM D471, and Hydraulic Oil Tellus 46 according to ASTM D471.

TABLE 2

| Test | Ex. A | Ex. B | Ex. C | Ex. D | Ex. E | Ex. F | Ex. G |
|---|---|---|---|---|---|---|---|
| Rheometer 191° C. | | | | | | | |
| Min torque - ML | 2.267 | 1.694 | 1.171 | 1.504 | 1.685 | 1.724 | 1.627 |
| Max - MH | 12.85 | 12.01 | 10.13 | 11.66 | 12.17 | 12.06 | 12.35 |
| T rise - TS1 | 1.66 | 1.73 | 2.33 | 2.34 | 1.78 | 1.96 | 2.28 |
| T90 | 7.73 | 6.49 | 7.05 | 6.11 | 7.79 | 6.84 | 6.2 |
| AMT - Delta | 10.58 | 10.32 | 8.955 | 10.15 | 10.48 | 10.33 | 10.68 |
| Viscosity 100° C. | | | | | | | |
| Initial | 75.13 | 71.5 | 62.13 | 56.36 | 67.22 | 60.59 | 56.44 |
| ML1+4 | 61.07 | 54.82 | 46.92 | 43.83 | 52.86 | 46.54 | 43.64 |
| Physical properties (original) | | | | | | | |
| Hardness shore A | 76 | 77 | 73 | 75 | 73 | 73 | 72 |
| Tensile (Mpa) | 7.0 | 6.2 | 5.7 | 5.1 | 6.6 | 6.4 | 5.6 |
| Tensile (Psi) | 1018 | 899 | 830 | 744 | 952 | 928 | 819 |
| Modulus 100% (psi) | 618 | 522 | 425 | 336 | 513 | 435 | 353 |
| Modulus 200% (psi) | 869 | 759 | 652 | 529 | 775 | 694 | 581 |
| Modulus 300% (psi) | 987 | 878 | 781 | 677 | 904 | 842 | 738 |
| Elongation % | 338 | 337 | 343 | 370 | 364 | 377 | 376 |
| Specific gravity | 1.3423 | 1.2649 | 1.192 | 1.1235 | 1.2799 | 1.2032 | 1.1071 |
| Green Strength (dumbbell) | | | | | | | |
| Hardness shore A | 64 | 65 | 59 | 60 | 63 | 61 | 59 |
| Tensile (Mpa) | 1.1 | 1.2 | 1.0 | 0.9 | 1.1 | 0.9 | 0.9 |
| Tensile (Psi) | 162 | 172 | 144 | 131 | 158 | 131 | 131 |
| Modulus 10% (psi) | 24 | 23 | 21 | 20 | 22 | 21 | 20 |
| Modulus 50% (psi) | 110 | 111 | 91 | 92 | 83 | 73 | 81 |
| Modulus 100% (psi) | 157 | 172 | 142 | 127 | 148 | 116 | 126 |
| Modulus 200% (psi) | 124 | — | — | — | — | 128 | — |
| Elongation % | 136 | 124 | 124 | 151 | 151 | 212 | 128 |
| Fluid Immersion (IRM 903/100 deg C./70 hrs) | | | | | | | |
| Hardness shore A | 41 | 39 | 40 | 37 | 40 | 40 | 38 |
| Change in Hardness | −35 | −38 | −33 | −38 | −33 | −33 | −34 |
| Tensile (Mpa) | 5.7 | 5.0 | 4.4 | 3.9 | 5.1 | 4.6 | 4.1 |
| Tensile (Psi) | 828 | 726 | 643 | 569 | 736 | 668 | 595 |

TABLE 2-continued

| Test | Ex. A | Ex. B | Ex. C | Ex. D | Ex. E | Ex. F | Ex. G |
|---|---|---|---|---|---|---|---|
| Retained Tensile (psi) | 81% | 81% | 77% | 76% | 77% | 72% | 73% |
| Modulus 100% (psi) | 359 | 303 | 250 | 211 | 295 | 272 | 120 |
| Modulus 200% (psi) | 659 | 576 | 488 | 428 | 570 | 530 | 232 |
| Modulus 300% (psi) | 809 | 729 | 626 | 560 | 731 | 678 | 475 |
| Elongation % | 297 | 302 | 319 | 314 | 309 | 297 | 293 |
| Retained Elongation % | 88% | 90% | 93% | 85% | 85% | 79% | 78% |
| Volume Swell (%) | 75.82 | 71.23 | 68.49 | 71.08 | 73.69 | 72.25 | 67.42 |

The evaluations carried out for the examples, Ex. A through Ex. G, above, showed increasing glass microsphere content lowered specific gravity (Ex. B through Ex. G) in comparison the Ex. A, which contained no glass microsphere content, while maintaining acceptable material properties.

In addition those hoses described herein above, embodiments of the disclosure may also be useful for land based storage and conveyance. Also, embodiments of the disclosure may be useful for aircraft or automotive applications where lighter weight is an advantage, hence better fuel economy, or applicable to conveyor belts (i.e. lower motor torque needs), or even applicable for power transmission belts where lower weight belts may have advantages.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising an inner tube defining a central longitudinal axis there through, an outer cover layer, and a first reinforcement layer disposed between the inner tube and the outer cover layer, wherein a rubber compound forming one or more of the inner tube or the outer cover layer comprises glass beads, and wherein the rubber compound has a specific gravity of 2.5 or less.

2. The hose according to claim 1, wherein the rubber compound has a specific gravity of 1.3 or less.

3. The hose according to claim 1, wherein the rubber compound has a specific gravity of 1.1 or less.

4. The hose according to claim 1, wherein the rubber compound comprises glass beads in an amount of 20 phr or less.

5. The hose according to claim 1, wherein the rubber compound comprises glass beads in an amount of 40 phr or less.

6. The hose according to claim 1, wherein the rubber compound comprises glass beads in an amount of 100 phr or less.

7. The hose according to claim 1 further comprising a second reinforcement layer disposed between the first reinforcement layer and the outer cover layer.

8. The hose according to claim 7 further comprising a friction layer disposed between the first reinforcement layer and the second reinforcement layer.

9. The hose according to claim 8, wherein rubber compounds forming the inner tube, the outer cover layer and the friction layer each comprises glass beads.

10. The hose according to claim 1, wherein rubber compounds forming the inner tube and the outer cover layer each comprises glass beads.

11. A pneumatic hose comprising an inner tube defining a central longitudinal axis there through, an outer cover layer, and a first reinforcement layer disposed between the inner tube and the outer cover layer, wherein a rubber compound forming one or more of the inner tube or the outer cover layer comprises glass beads, and wherein the hose has an inner diameter of 1 cm to 2 cm, and a wall thickness of from 1 mm to 3 mm.

12. The pneumatic hose according to claim 11, wherein the rubber compound has a specific gravity of 2.5 or less.

13. The pneumatic hose according to claim 11, wherein the rubber compound has a specific gravity of 1.3 or less.

14. The pneumatic hose according to claim 11, wherein the rubber compound comprises glass beads in an amount of 40 phr or less.

15. The pneumatic hose according to claim 11, wherein the rubber compound comprises glass beads in an amount of 100 phr or less.

16. A buoyant hose comprising an inner tube defining a central longitudinal axis there through, an outer cover layer, and a first reinforcement layer disposed between the inner tube and the outer cover layer, wherein a rubber compound forming one or more of the inner tube or the outer cover layer comprises glass beads, and wherein the hose has an inner diameter of 5 cm to 30 cm, and a wall thickness of from 2 mm to 8 mm.

17. The buoyant hose according to claim 16, wherein the rubber compound has a specific gravity of 2.5 or less.

18. The buoyant hose according to claim 16, wherein the rubber compound has a specific gravity of 1.3 or less.

19. The buoyant hose according to claim 16, wherein the rubber compound comprises glass beads in an amount of 40 phr or less.

20. The buoyant hose according to claim 16, wherein the rubber compound comprises glass beads in an amount of 100 phr or less.

* * * * *